United States Patent [19]

Steinmetz et al.

[11] 3,914,746

[45] Oct. 21, 1975

[54] ELECTRONIC DATA-PROCESSING SYSTEM AND METHOD OF OPERATING SAME

[75] Inventors: Hans-Joachim Steinmetz, Karlsruhe; Helmut Rahm, Kandel; Karl-Ludwig Paap, Karlsruhe, all of Germany

[73] Assignee: Matth. Hohner AG, Trossingen, Germany

[22] Filed: Feb. 25, 1974

[21] Appl. No.: 445,134

[30] Foreign Application Priority Data

Feb. 23, 1973 Germany............................ 2309029

[52] U.S. Cl. ............................................. 340/172.5

[51] Int. Cl.$^2$............................................ G06F 9/00

[58] Field of Search........................ 340/172.5; 444/1

[56] References Cited

UNITED STATES PATENTS

| | | | |
|---|---|---|---|
| 3,629,853 | 12/1971 | Newton | 340/172.5 |
| 3,644,900 | 2/1972 | Mizoguchi | 340/172.5 |
| 3,657,705 | 4/1972 | Mekota et al. | 340/172.5 |
| 3,700,873 | 10/1972 | Yhap | 340/172.5 X |
| 3,718,912 | 2/1973 | Hasbrouck et al. | 340/172.5 |
| 3,764,988 | 10/1973 | Onishi | 340/172.5 |

*Primary Examiner*—Mark E. Nusbaum
*Attorney, Agent, or Firm*—Karl F. Ross; Herbert Dubno

[57] ABSTRACT

12-bit instruction words, successively read out from a subprogram memory of a minicomputer, are divided into a first section I composed of the four lowest-ranking bits $Z_0$–$Z_3$, a second section II consisting of the fifth bit $Z_4$, a third section III composed of the next three bits $Z_5$–$Z_7$, and a fourth section IV constituted by the four highest-ranking bits $Z_8$–$Z_{11}$. Bit $Z_{11}$ is used to discriminate between numerical and routing instructions, on the one hand, and jump instructions, on the other hand. A special code formed by bits $Z_8$–$Z_{10}$ of section IV distinguishes (with $Z_{11} = 0$) between numerical and routing instructions as well as (with $Z_{11} = 1$) between jump-forward and jump-back instructions. In a numerical instruction, the bits of section I carry data to be fed to an accumulator whereas those of section III represent an operation code. In a routing instruction, the bits of sections I and II identify stages of an interim register giving access to address registers associated with storage and input/output units whereas those of groups III and IV (excluding bit $Z_{11}$) serve as an operation code. In a jump-forward instruction, sections I–III form an address code for the subprogram memory whereas section IV (again without bit $Z_{11}$) is an operation code for the selection of a specific code word in a group of such code words identified by the address code. In a jump-back instruction, sections I–III are unused.

23 Claims, 25 Drawing Figures

| $J_1 = J_3$ | $K_1 = K_3$ | $J_2 = J_4$ | $K_2 = K_4$ | P = 0 $Q_1 = Q_3$ | P = 0 $Q_2 = Q_4$ | P = 0 $Y_4$ | P = 1 $Q_1 = Q_3$ | P = 1 $Q_2 = Q_4$ | P = 1 $Y_4$ |
|---|---|---|---|---|---|---|---|---|---|
| 0 | 0 | 0 | 0 | 0 | 0 | 0 | 1 | 0 | 0 |
| 1 | 0 | 0 | 0 | 1 | 0 | 0 | 0 | 1 | 0 |
| 0 | 1 | 0 | 0 | 1 | 0 | 0 | 0 | 1 | 0 |
| 1 | 1 | 0 | 0 | 0 | 1 | 0 | 1 | 1 | 0 |
| 0 | 0 | 1 | 0 | 0 | 1 | 0 | 1 | 1 | 0 |
| 1 | 0 | 1 | 0 | 1 | 1 | 0 | 0 | 0 | 1 |
| 0 | 1 | 1 | 0 | 1 | 1 | 0 | 0 | 0 | 1 |
| 1 | 1 | 1 | 0 | 0 | 0 | 1 | 1 | 0 | 1 |
| 0 | 0 | 0 | 1 | 0 | 1 | 0 | 1 | 1 | 0 |
| 1 | 0 | 0 | 1 | 1 | 1 | 0 | 0 | 0 | 1 |
| 0 | 1 | 0 | 1 | 1 | 1 | 0 | 0 | 0 | 1 |
| 1 | 1 | 0 | 1 | 0 | 0 | 1 | 1 | 0 | 1 |
| 0 | 0 | 1 | 1 | 0 | 0 | 1 | 1 | 0 | 1 |
| 1 | 0 | 1 | 1 | 1 | 0 | 1 | 0 | 1 | 1 |
| 0 | 1 | 1 | 1 | 1 | 0 | 1 | 0 | 1 | 1 |
| 1 | 1 | 1 | 1 | 0 | 1 | 1 | 1 | 1 | 1 |

ELECTRONIC DATA-PROCESSING SYSTEM AND METHOD OF OPERATING SAME

FIELD OF THE INVENTION

Our present invention relates to an electronic data-processing system, of a type sometimes termed a mini-computer, in which a plurality of binary signals are handled in parallel upon being read out from a subprogram memory as part of an instruction word.

BACKGROUND OF THE INVENTION

Complex instruction words, referred to hereinafter as macroinstructions, can be subdivided into a plurality of constituent words, referred to hereinafter as microinstructions, that can be stored in individually addressable stages of the subprogram memory from which they can be called out to perform a program step or to advance (or return) to some specified point in the subprogram. Thus, such words may be variably classified as numerical instructions, specifying different operations on selected constants; routing instruction, serving to select data or program information stored in a central memory; jump-forward instructions, calling forth a word from a new address of the subprogram memory; and jump-back instructions, commanding another readout from an address previously specified in the latter memory.

Numerical instructions have no address code but contain an operation code as well as data. Routing instructions are composed of an operation code and an address code. Jump-forward instructions also contain an operation code which in this case serves for the selection of an instruction word among a group of such words identified in the subprogram memory by the accompanying address code, the latter generally having considerably more bits than does the corresponding code of a routing instruction. The jump-back instruction can be limited to a single bit combination in the position of the operation code.

This diversity in composition and component size of the various instructions has heretofore led to the adoption of multibit words with a large amount of redundancy, i.e. unused bit positions, in each instance. This, in turn, requires a subprogram memory of large storage capacity and complicates the associated circuitry.

OBJECTS OF THE INVENTION

The general object of our present invention, therefore, is to provide a data-processing system of the character set forth, as well as a method of operating same, which considerably reduces this redundancy without diminishing the versatility of the computer.

Another object is to provide, in a system of this nature, means for substantially increasing the number of addresses that can be selectively called out from a processing memory with a routing-instruction word having only a limited number of bit positions allocated to its address code.

It is also an object of this invention to provide a mini-computer-type system whose components can be designed in modular form so as to be easily and cheaply mass-produced, using integrated-circuit technique as known, for example, under the designations TTL (transistor-transistor logic), MSI (medium-scale integration), LSI (large-scale integration) and MOS (metal-oxide/silicon).

A more specific object of the invention is to provide a method of and means for enabling multipurpose utilization of available storage and transmission facilities in a computer system.

SUMMARY OF THE INVENTION

We realize the foregoing objects, in accordance with our present invention, by dividing an instruction word of $n$ bits into at least three sections, i.e. a classification section preferably encompassing the highest-ranking bits, an operation/address section, and a data/address section preferably composed of the lowest-ranking bits. As the designations imply, the operation/address section is alternately allocable to an operation code and an address code whereas the data/address section can be alternately used for an address code or for data. A corresponding division exists in an extraction circuit serving for the parallel readout of the bits of each instruction word from the subprogram memory in which it is stored; thus, the extraction circuit may comprise at least three channels respectively assigned to the aforementioned word sections, each channel usually consisting of a plurality of leads carrying the respective bits of the associated section. The channel leads may originate at an $n$-stage output register of the subprogram memory and extend partly to a processor served by the subprogram memory, partly to a functional decoder and partly to a selection circuit used for addressing that memory in the case of a jump instruction. A jump instruction (of either the jump-forward or the jump-back type) is distinguished from the other kinds of instruction by a characteristic binary value (e.g. 1) of a discriminating bit in its classification section, preferably the highest-ranking ($n^{th}$) bit.

Thus, in our improved system the number of bits per instruction word can be considerably reduced inasmuch as some sections of that word do double duty, as data/address and operation/address sections, according to the nature of the instruction as determined by its classification section which also doubles as an operation section. As will be shown in greater detail hereinafter, this technique enables a reduction of redundancy by more than 90%.

More specifically, the two channels used for operation codes (i.e. those serving the classification and operation/address sections) extend to the functional decoder which, from the nature of the classification section, determines whether the word issuing from the subprogram memory is a numerical, routing or jump instruction. The classification section is also transmitted to a control unit associated with the selection circuit of the subprogram memory so that, in the event of a jump instruction, the address code of the word can be decoded in order to modify the readout sequence of that memory by selecting a specific word as a new point of departure in the subprogram or, in the case of a jump-back instruction, reverting to an earlier point in the subprogram. The channels assigned to the data address and operation/address sections extend to that selection circuit, more particularly to a jump-address register forming part thereof, so that all the bits represented by these sections are available for the jump-address code. At the same time the operation code in the classification section, in the case of a jump-forward instruction, generates supplemental jump-address signals in the decoder output for further identification of the selected word.

The channel serving the data/address section extends also, on the one hand, to an accumulator in the processor and, on the other hand, to an interim register thereof giving access to respective field-address registers of a storage unit, or central memory, and of an input/output (I/O) unit; the storage unit, the I/O unit and the interim register are connected across the accumulator in separate loops, the interim register being connected to these two units via respective branches enabling selective exchange of digital information between the storage unit, the I/O unit and the accumulator. In the case of a word identified as a numerical instruction, its data/address section is fed directly to the accumulator as an operand to be processed in accordance with the contents of the associated operation/address section. In the case of a word identified as a routing instruction, the contents of the data/address section are transmitted by the corresponding channel to the interim register as an operand-address code specifying a location in that register into which an item of digital information from the accumulator is to be written or from which such an item is to be read out. This item may have data character and may therefore be returned directly to the accumulator as an operand; on the other hand, the item could be an address in the central memory, identifying data or a further program step accessible through the field-address register of the storage unit, or else the address of an input or output device to be called into service through the field-address register of the I/O unit.

In this way, a composite macroinstruction can be performed in a series of microinstructions read out of the subprogram memory in conformity with the general program. Thus, the subprogram memory may respond to a macroinstruction by entering an operational part thereof in a predetermined stage of the interim register, by way of the accumulator, after first calling the corresponding item or items out of storage in the central memory. In a subsequent phase of the sequence "read macroinstruction" the contents of that register stage are processed and returned to the accumulator for further handling. A macroinstruction requiring, for example, the extraction of an item at one address of the storage unit and its arithmetic addition to an item at another address thereof, as commanded by the operational part of that macroinstruction, may be carried out in response to a predetermined numerical code delivered for this purpose to the accumulator, the value of the code being ascertained by feeding a train of counting pulses into the accumulator until its reading is zero. The counting pulses, in turn, may step a shift register in the functional decoder so as to energize one or more stage outputs thereof, thereby producing the requisite functional signals controlling the processor.

In a particularly advantageous embodiment, as more fully described hereinafter, each instruction word also has a further section which preferably consists of a single bit and which becomes part of the operand-address code in a routing instruction so that the length of this address code may be greater than that of the data section of a numerical instruction. The additional bit may be used, for instance, to switch between two halves of the interim register so as to enlarge its storage capacity.

The number of bits in an item of information capable of being treated in the processor, e.g. a four-bit combination, may be insufficient to specify all the field addresses of the central memory and/or of the I/O unit. In such a case, i.e. if the storage capacity of the corresponding address register is several times the number of bits of the items to be processed, two or more of these items may be needed to identify a field address. In order to obviate the need for using a series of instruction words for that purpose, another feature of our invention provides for an automatic modification of a field address temporarily stored in the interim register in the course of a single cycle of the subprogram memory by feeding back that address to the interim register through a modification circuit increasing or reducing its numerical value in response to signals emitted by the functional decoder on the basis of one or more bits in the operation/address section of the word being read. The modified address, adjoining the original address, is then transmitted to the corresponding field-address register in a later phase of the memory cycle, and this process may be repeated a limited number of times. Thus, if the address modifier changes the numerical value of the original address by $\pm 1$ on each pass, two successive passes of the recirculated address through the modifier will identify three adjoining memory stages at locations N, N+1, N+2 or N, N−1, N−2. Care should be taken in such a case, however, that field addresses to be loaded into or discharged from the interim register under the control of successive instruction words be spaced sufficiently far apart in the corresponding address register to prevent overlapping.

The bits available for the code of a jump address, in the data/address and operation/address sections of an instruction word, need only suffice to identify a number of addresses constituting a small fraction of the total store of instruction words in the subprogram memory inasmuch as they are used merely for the selection of word groups within which the desired word is identified by the output of the functional decoder receiving the classification section of the jump instruction. These groups may consist, for example, of respective columns of an orthogonal matrix whose rows are addressed by the decoder output. In some instances it will be possible to increase the capacity of the subprogram memory even further by making only some of its columns accessible to a jump instruction; thus, for example, only every other column may have a jump address so that the intervening columns can be reached solely through the overall program. This expedient somewhat reduces the flexibility of the system, yet the resulting simplification more than compensates for that drawback.

The selection circuit serving the subprogram memory advantageously comprises two multistage registers, the first one receiving the jump-address code through an electronic switch normally maintained by the associated control circuit in a position in which the bits of this code can be transmitted to that register via the assigned channels. Upon recognizing the jump instruction on the basis of its discriminating bit, the control circuit discharges the contents of this first register into an ancillary address decoder and in parallel therewith, stage by stage, into the second multistage register which retains them until the arrival of the next jump instruction. If the next jump instruction is of the jump-back type, the control circuit reverses the electronic switch in the input of the first multistage register to allow a parallel stage-by-stage retransmission of the previously stored address code to the latter register, thereby enabling this address to be read out to the ancillary decoder in the same cycle. Since in that switch position the bits from the data/address and the operation/address sections of the instruction word cannot reach the jump-address registers, the contents of these sections in a jump-back instruction are immaterial.

The arithmetic treatment of data in the processor usually involves a logical combination of several binary items in an arithmetic unit connected in a further loop across the accumulator. The arithmetic unit may perform such operations as adding with or without carry, combining respective bits with Boolean multiplication (AND function), or doing the same according to an Exclusive-OR function. Until the completion of all logical operations, the jump control circuit may be inhibited. An associated buffer register, inserted in a branch of the arithmetic loop, may be switchable by an electronic gate to receive the data of a numerical instruction directly from the extraction circuit of the subprogram memory. Advantageously, the connection leading from the interim register to the accumulator comprises two conductor multiples carrying mutually complementary binary information to minimize errors in transmission.

The various components of the system, including the subprogram memory, the central memory and the I/O unit, may be provided with individual timers establishing mutually independent operating cycles for these components, the necessary synchronization being afforded by correlating connections which start the operating cycle of one component at a predetermined point in the cycle of another component.

BRIEF DESCRIPTION OF THE DRAWING

The above and other features of our invention will now be described with reference to the accompanying drawing in which.

SPECIFIC DESCRIPTION

Figure 1A:
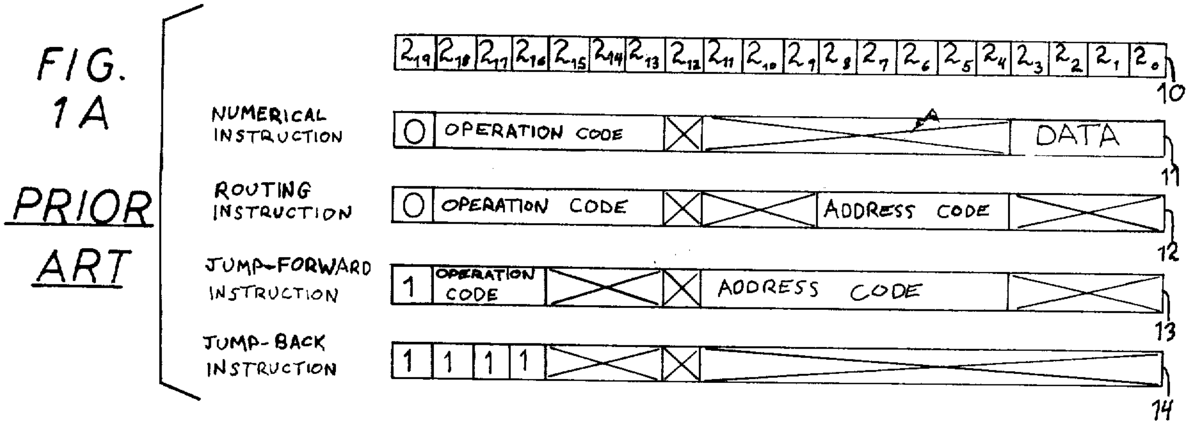
FIG. 1A PRIOR ART
FIG. 1A is a set of diagrams showing various classes of microinstruction words according to the prior art.

Reference will first be made to FIG. 1A showing a 20-bit instruction word 10 whose bits have been designated $Z_0$–$Z_{19}$. A numerical instruction 11 of this nature includes, in the highest-ranking position (No. 20), a discriminating bit $Z_{19}$ whose binary value 0 indicates that this is not a jump instruction. The four lowest-ranking bits $Z_0$–$Z_3$ constitute a data portion or operand; the next nine bits $Z_4$–$Z_{12}$ are unused. Six higher-ranking bits, $Z_{13}$–$Z_{18}$, form an operation code.

Another word 12 of the same length serves as a routing instruction. Here the first four bit positions $Z_0$–$Z_3$ are not used, ditto the positions $Z_9$–$Z_{12}$. An address code occupies the 5-bit section $Z_4$–$Z_8$; the discriminating bit and the operation section are in the same positions as in word 11.

At 13 there is shown a jump-forward instruction. It differs from the two preceding instructions by the fact that its discriminating bit $Z_{19}$ has the binary value 1. The fourth lowest-ranking bits $Z_0$–$Z_3$ are again unused. The address code encompasses here the eight bits $Z_4$–$Z_{11}$; bit positions $Z_{12}$–$Z_{15}$ are not utilized.

A further word 14 represents a jump-back instruction in which only the four highest-ranking bits $Z_{16}$–$Z_{19}$ are significant. Bit $Z_{19}$ again has the value 1 characterizing a jump instruction; the next three bits $Z_{16}$–$Z_{18}$ represent a special code combination (111 in this example) marking the word as of the jump-back type.

The 6-bit operation code of word 11 and the corresponding code of word 12 provide 64 different numerical instructions and as many different routing instructions. The operation code of word 13 has three bits which, with exclusion of the special bit combination (111) identifying a jump-back instruction, provide seven different jump-forward instruction. Jump-back instruction 14 is the only one of its kind.

The 64 numerical instructions have a redundancy of 9 bits out of 20; for the 64 routing instructions the proportion is 8/20 on 2/5. The seven jump-forward instructions also have a 2/5 redundancy, whereas the single-jump back instruction has 16 of its 20 bit positions vacant, i.e. a redundancy proportion of 4/5. Averaging these values, we find an overall redundancy on the order of 40%; this order of magnitude does not change significantly if the $13^{th}$ bit $Z_{12}$, which is unused in all four modes, is eliminated so as to reduce the total number of bits to 19.

Figure 1B:
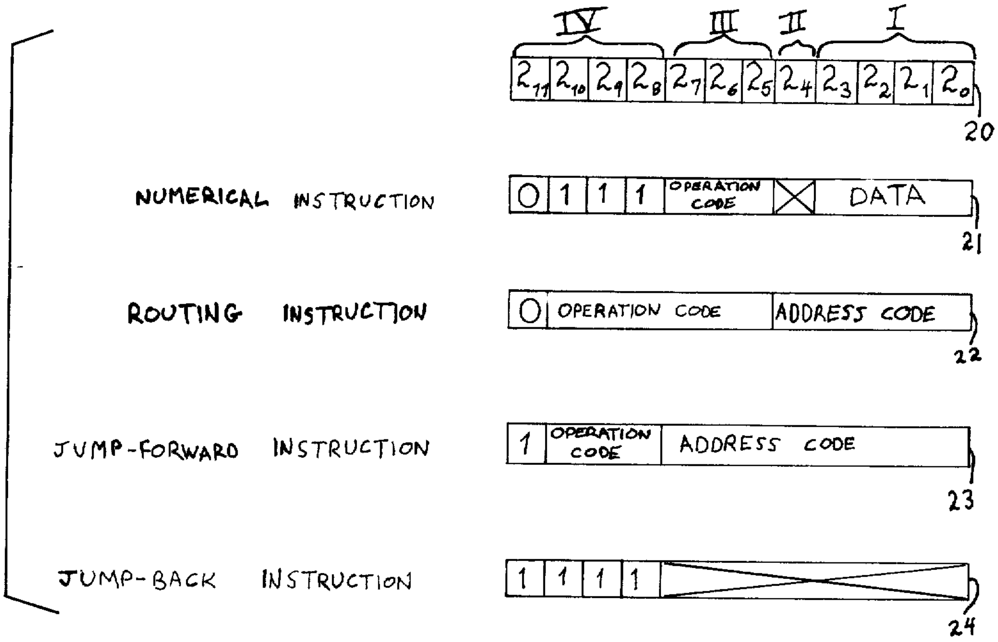
FIG. 1B is a similar set of diagrams showing corresponding microinstruction words according to our invention.

Let us now consider a 12-bit instruction word 20 according to our invention as shown in FIG. 1B. This word is divided into a data/address section I encompassing the bits $Z_0$–$Z_3$, a further section II consisting of a single bit $Z_4$, an operation/address section III composed of bits $Z_5$–$Z_7$, and a classification section IV formed by the highest-ranking bits $Z_8$–$Z_{11}$ including the discriminating bit $Z_{11}$.

At 21 there is shown a numerical instruction of this composition comprising a 4-bit data part in section I, a single unused bit $Z_4$ (section II), a 3-bit operation code in section III, and a special code (here again 111) in section IV; this special code, together with the discriminating bit $Z_{11} = 0$, classifies the word 21 as a numerical instruction.

At 22 there is shown a routing instruction in which sections I and II are occupied by an address code; the operation code consists of the three bits $Z_5$–$Z_7$ of section III as well as three further bits (i.e. all except the discriminating bit $Z_{11}$) of section IV. Here, again, the criterion $Z_{11} = 0$ indicates that this is not a jump instruction. -

A jump-forward instruction, shown at 23, is characterized by $Z_{11} = 1$ and by the absence of the special code 111 from section IV. Its address code, of eight bits, encompasses sections I, II and III; its classification code consists of bits $Z_8$–$Z_{11}$.

At 24 we have indicated the single jump instruction required by this system. By virtue of its discriminating bit and the special code in section IV, i.e. $Z_8 = Z_9 = Z_{10} = Z_{11} = 1$, this word differs from the corresponding prior-art word 14 (FIG. 1A) only by the fact that the number of its unused bits has been reduced from 16 to 8.

Redundancy can again be calculated on the basis of seven numerical instructions with one unused bit, 56 routing instructions with all bits utilized, seven jump-forward instructions also without a vacant bit position, and a single jump-back instruction with a vacancy ratio of 2/3. On the average, then, the redundancy is about 2%.

Figure 1C:
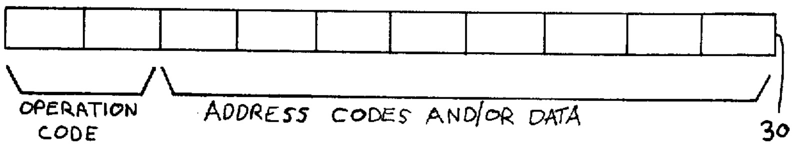
FIG. 1C is a diagram of a macroinstruction word composed of several microinstruction words according to the invention.

Several microinstructions as shown in FIG. 1B may be concatenated to form a macroinstruction as illustrated at 30 in FIG. 1C. Such a macroinstruction, as schematically indicated, may comprise one or two operation-code sections and from two to eight operand sections containing address codes and/or data.

In subsequent Figures of the drawing, single conductors have been shown in thin lines whereas conductor multiples or cables have been symbolized by heavy lines. In an analogous manner, symbols for logical elements (e.g. AND gates) have been drawn in thin lines to indicate individual elements but have been shown heavy to represent a plurality of such elements connected in parallel.

Figure 2:
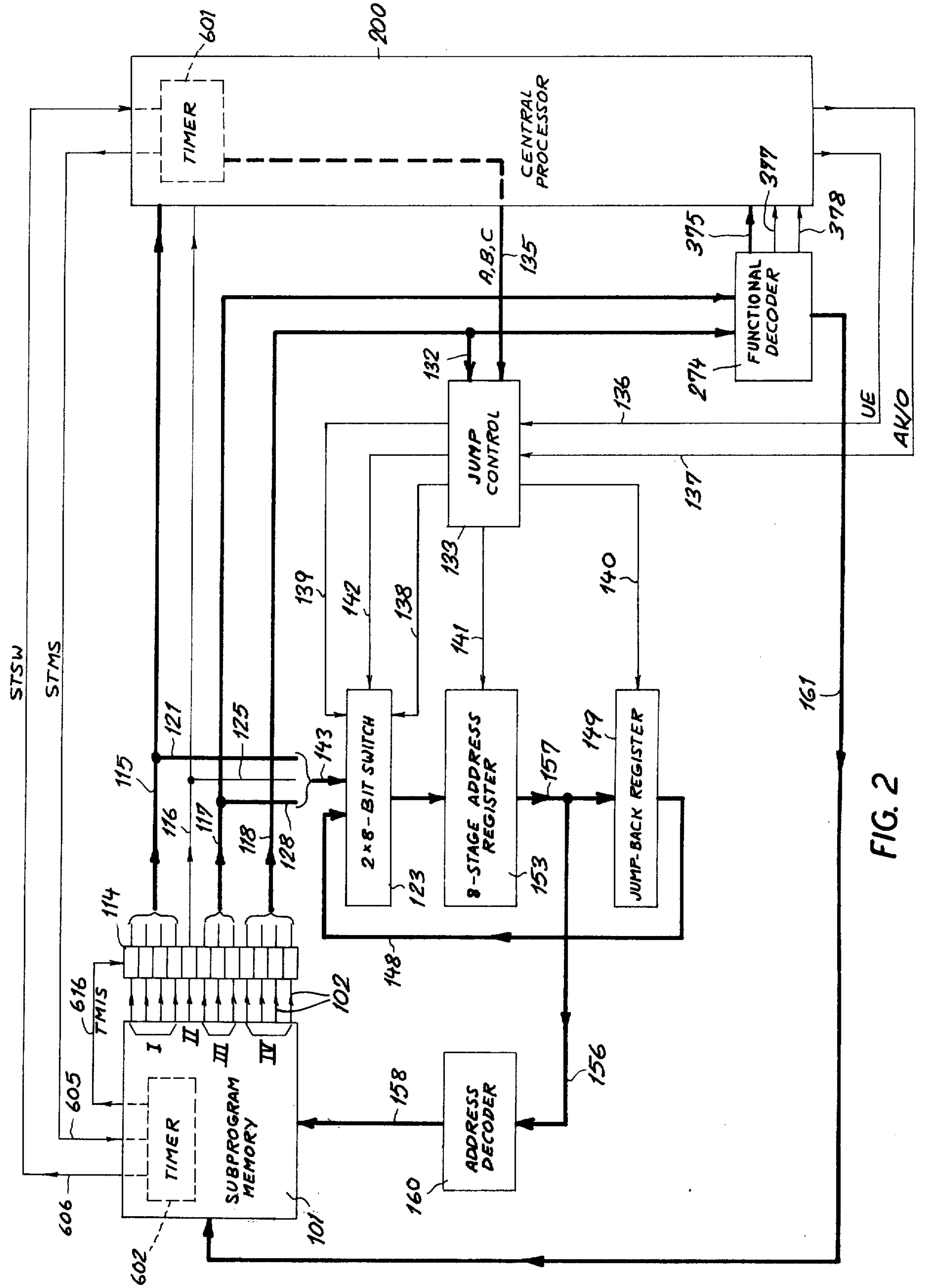
FIG. 2 is an overall block diagram of a minicomputer embodying our invention.

Reference will now be made to FIG. 2 in which we have shown the overall structure of a data-processing system according to our invention. A central processor 200, more fully described hereinafter, co-operates with a subprogram memory 101 in the form of an orthogonal matrix of storage elements for a multiplicity of instruction words of the type shown in FIG. 1B. The storage elements are preferably of the semiconductive code, though ferrite cores could also be used. A succession of operating cycles for memory 101 is established by a timer 602.

A lead 605 carries a start signal STMS from a master timer 601 in the central processor 200 to initiate the readout of an instruction word at the beginning of a memory cycle. In turn, the timer 602 informs timer 601 by a signal STSW on a lead 606 that a specified instruction has been extracted and that a reading and processing cycle can take its course. Except in response to a jump instruction, as more fully discussed below, the selection of successive words to be read out from memory 101 is controlled by a main programmer in a manner known per se and not further relevant insofar as our present improvement is concerned.

The 12 bits of each instruction word extracted from memory 101 are read out in parallel via a set of leads 102 into a 12-stage buffer register 114; the leads 102 and the stages of register 114 are subdivided in the same manner as the instruction word, i.e. into sections I, II, III and IV. Section I is served by four reading conductors constituting a channel 115; a single conductor 116 carries the bit of section II. Sections III and IV work into channels 117 and 118 of three and four conductors, respectively. Channels 115 and 116 extend to processor 200 and also have respective branches 121 and 125 leading to a 2×8-bit electronic switch 123 in the input of an 8-stage address register 153. Channels 117 and 118 extend to a functional decoder 274; a branch 128 of channel 117 also leads to switch 123, the eight conductors of these three branches having been collectively designated 143. The eight stage outputs of register 153 are connected via a multiple 167 to as many stages of a jump-back register 149 whose outputs are returned via a multiple 147 to the switch 123. A branch 156 of multiple 157 terminates at an address decoder 160 from which 512 leads, collectively designated 158, extend to respective horizontal inputs of memory 101. Energization of any lead 158 preselects a column of storage elements in memory 101 whose vertical inputs are served by seven leads of a multiple 161 emanating from decoder 274.

Channel 118 has a branch 132 for delivering the bits of section IV to a jump-control unit 133 also receiving timing pulses A, B, C by way of a multiple 135 from timer 601. An accumulator 258 and an arithmetic unit 264 (FIG. 3) in processor 200 deliver respective signals AK/O and UE via leads 137 and 136 to control unit 133, allowing same to function when the accumulator is emplty and after all arithmetic operations have been completed.

Switch 123, responsive to signals on a pair of leads 138 and 139 from control unit 133, normally (i.e. in the absence of a jump instruction) is in a position in which multiple 143 is connected to register 153; however, the connection is blocked in the absence of an enabling signal on a lead 142. Another output lead 141 of control unit 133 carries a timing pulse for the unloading of register 153; a further lead 140 is similarly energizable to discharge the register 149.

Decoder 274 has a number of output leads, including a multiple 375 and individual conductors 377, 378, which form signal paths extending into the processor 200. Conductors 377 and 378 are alternately energizable, in the presence of a routing instruction, to carry a signal STSR or STEA for starting the operating cycles of respective timers 604 and 603 in an input/output unit 210 or in a storage unit 236, FIG. 3, depending on which of these units is to be addressed. Multiple 375 carries other functional signals more fully described hereinafter.

Decoder 274 may contain a multistage electronic switch, such as circuit 123, controlled by the discriminating bit $Z_{11}$ (FIG. 1B) in channel 118 to direct the bits of that channel to a group of flip-flops working into the multiple 161, this group preserving any operation code (other than the special code 111) of a jump instruction until the next such instruction is received. If this next jump instruction is of the jump-back type, control unit 133 energizes its lead 140 to retransmit the contents of register 149 via switch 123 to register 153 whence the address code is promptly read out into decoder 160 upon energization of lead 141. Since the lead of multiple 161 now energized by decoder 274 is the same as on the preceding forward jump, the previously extracted microinstruction is now again read out from memory 101.

Figure 3:
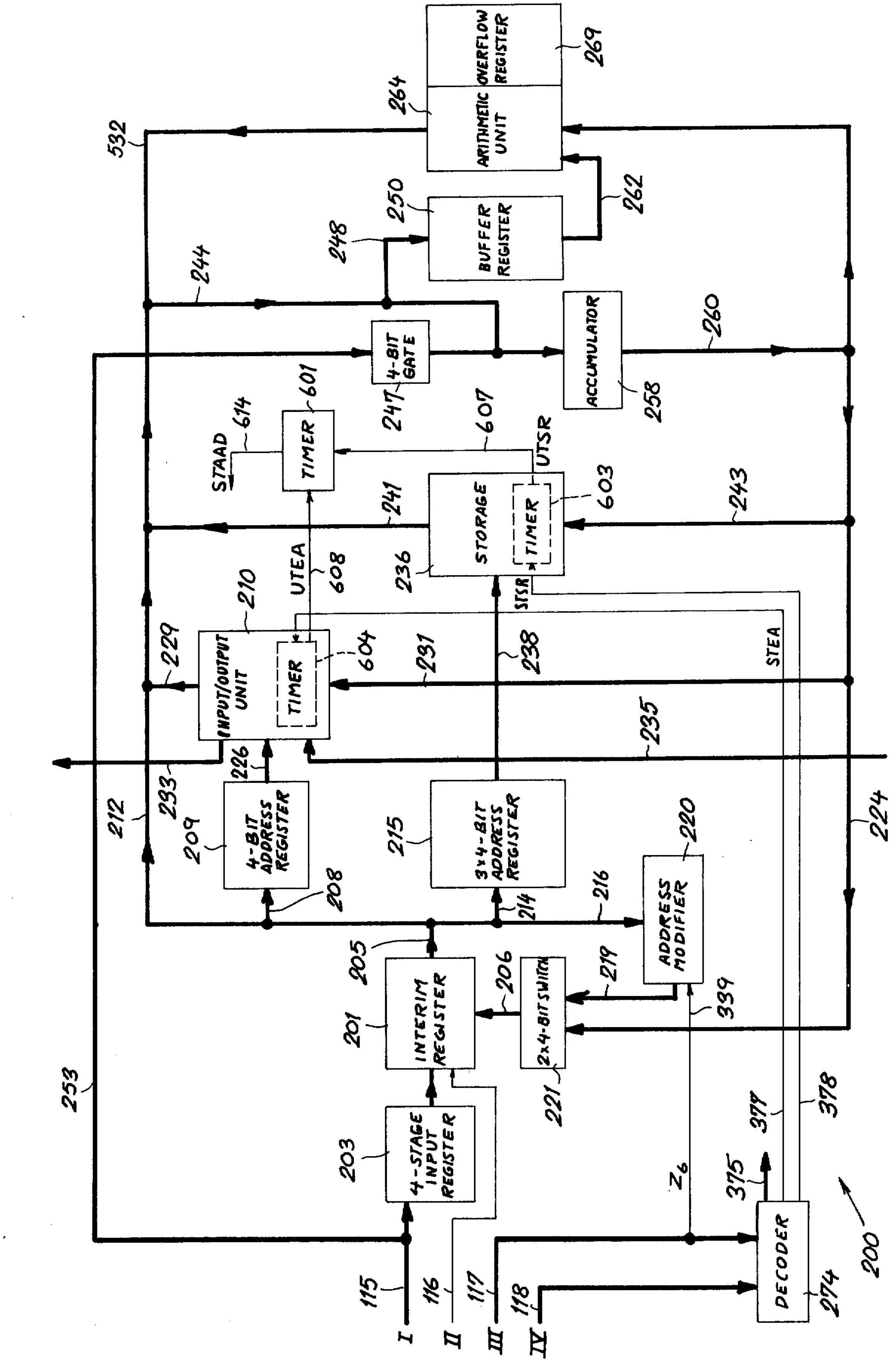
FIG. 3 is a block diagram showing details of a central processor included in the system of FIG. 2.

As further illustrated in FIG. 3, channel 115 terminates at a 4-stage input register 203 (which, like other such registers in this system, may be designed as a binary counter) but has a branch 253 extending to a 4-bit electronic gate 247 giving access to accumulator 258. Register 203 serves to address an interim register 201 also connected to lead 116. An output multiple 205 of register 201 has a branch 212, acting as an outgoing bus bar, and two further branches 208, 214 extending to two field-address registers 209, 215. Register 209 accommodates four bits and gives access to I/O unit 210; register 215 has three times that capacity and gives access to the main storage unit or central memory 236. A spur 216 of multiple 205 leads to an address modifier 215, more fully described below with reference to FIG. 4A, which lies in a feedback loop of register 201 passing through a 2×4-bit electronic switch 221 generally similar to switch 123 of FIG. 2; each of these switches may comprise, for example, two sets of parallel AND gates arranged in pairs which can be alternately unblocked and whose outputs merge in respective OR gates feeding, in the case of switch 221, the loading inputs of register 201 through a 4-lead multiple 206. Switch 221 lies at the junction of multiple 206 with two other 4-lead multiples, i.e. a connection 219 from address modifier 220 and an incoming bus bar 224. A lead 339, branching off channel 117, carries the bit $Z_6$ to the address modifier 220.

I/O unit is connected between bus bars 224 and 212 by way of respective multiples 231, 229 and is addressable from register 209 via a 4-lead multiple 226. Storage unit 236 is similarly connected between bus bars 224 and 212, through respective multiples 243 and 241, and is addressable from register 215 via a 12-lead multiple 238 as described hereinafter in greater detail. Timer 603 in unit 236 is connected by way of a correlating lead 607 to master timer 601 from which a path 614, carrying a start signal STAAD, leads back to the decoder 274. A correlating connection 608 also links the timer 604 of I/O unit 210 with master timer 601. Unit 210 is further provided with an input multiple 235, originating for example at a keyboard 401 (FIG. 4B), and with an output multiple 233, carrying information to a printer 402 (also shown in FIG. 4B) and other, nonillustrated loads.

Accumulator 258 is directly accessible from bus bar 212 through a multiple 244 having a branch 248 which enters a buffer register 250 communicating via an extension 262 of that branch with arithmetic unit 264, the latter being conventionally provided with an overflow register 269. An output multiple 532 closes a loop from arithmetic unit 264 through accumulator 258 which, by way of bus bars 212 and 224, also lies in three other loops linking it with register 201, I/O unit 210 and memory 236.

If a numerical instruction is read out from the subprogram memory 101 of FIG. 2, a fact communicated to the processor by the decoder 274 via signal path 375, its data portion is delivered to accumulator 258 by way of bus bar 253 and gate 247 which is opened under these circumstances as described below with reference to FIG. 4C. Interim register 201 does not intervene at this time so that the value of the bit present on lead 116 is immaterial.

If the extracted word is a routing instruction, its operand-address code (sections I and II) is fed — partly via input register 203 — to interim register 201 to cause either a writing into that register or a readout from that register at the indicated address. In the presence of certain bit combinations in section III of that instruction, as detected by decoder 274, switch 221 is periodically reversed in the course of an operating cycle whereby a field address fed via multiples 205, 214 into register 215 is recirculated to register 201 in modified form before being again read out into register 215. Depending on the value of bit $Z_6$ on lead 339, the address modification may be positive (increment +1) or negative (increment −1). Thus, three adjoining addresses may be successively communicated in the same cycle to register 215 for identifying, say, a program step stored in central memory 236. In this way, the described system may deliver up to 12 bits to the accumulator 258 which, as mentioned above, can be emptied by pulses from a nonillustrated source to produce a count determining the further program. Since the operation of such an accumulator is well known per se, its details need not be further described.

If desired, the address register 209 of I/O unit 210 could be similarly expanded to afford a greater selection of input or output elements co-operating with the processor 200.

Reference will next be made of FIG. 4A for a more detailed description of the exchange of information between the accumulator 258 and units 210, 236 under the control of operand addresses appearing in channels 115 and 116. Interim register 201 is shown divided into two halves 301, 302 each capable of storing 16 4-bit items of information, i.e. field addresses of registers 209 and 215. Input register 203, receiving section I of a routing instruction over channel 115, is made receptive to the incoming bits by a signal LOAD on a lead 379 and is unloaded into register 201 via a multiple 307 by a writing signal WE on a lead 319. Lead 116, carrying the bit $Z_4$ of section II, is connected directly to a setting input and through an inverter 311 to a resetting input of a flip-flop 312 with output leads 313, 314 terminating at respective pairs of AND gates 317, 318 and 315, 316. AND gates 315 and 317 also have inputs connected to writing lead 319 whereas AND gates 316 and 318 have inputs connected to another lead 320 energizable by a reading signal ME. Gates 315 and 316 serve the register half 301 while gates 317 and 318 are associated with register half 302. Store 301 is therefore utilized when lead 116 is de-energized with $Z_4 = 0$; in the opposite case, i.e. with $Z_4 = 1$, store 302 is in service.

Thus, the writing pulse WE unloading the rgister 203 unblocks either the gate 315 or the gate 317 to activate the store 301 or 302 for receiving the first four bits $Z_0$–$Z_3$ of the instruction word in a nonillustrated decoding section of that store so as to mark one of its 16 locations for inscription of the current contents of accumulator 236 via bus bar 224, switch 221 and multiple 206.

Figure 6A:
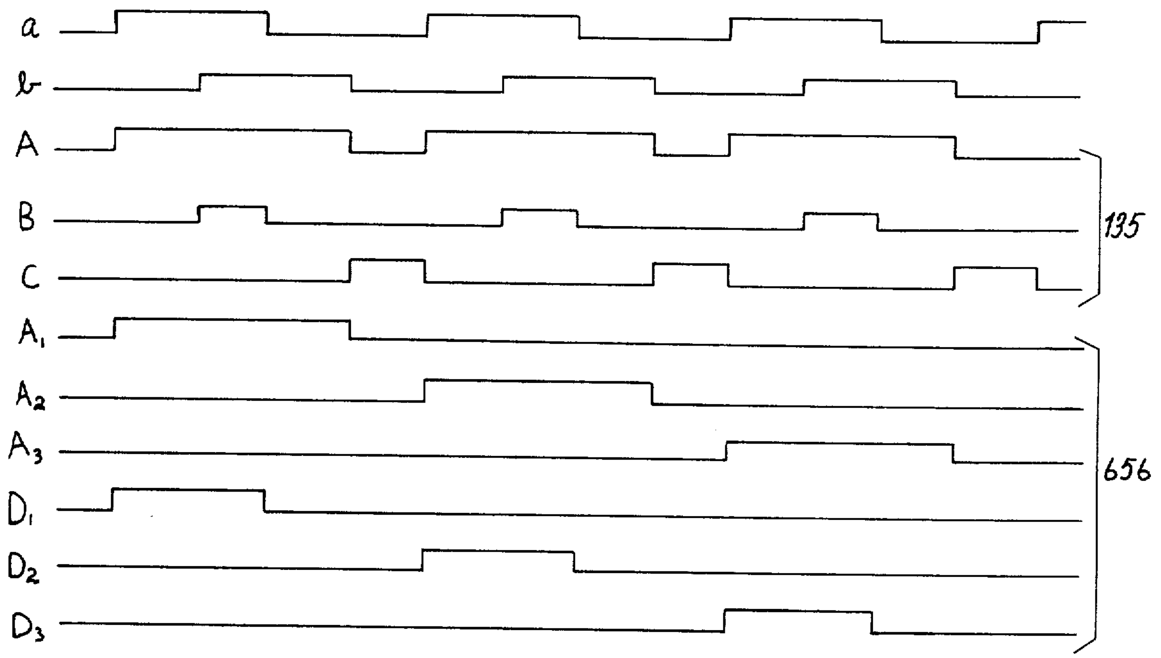
FIG. 6A is a set of graphs relating to the operation of the assembly of FIG. 5A.
Figure 6B:
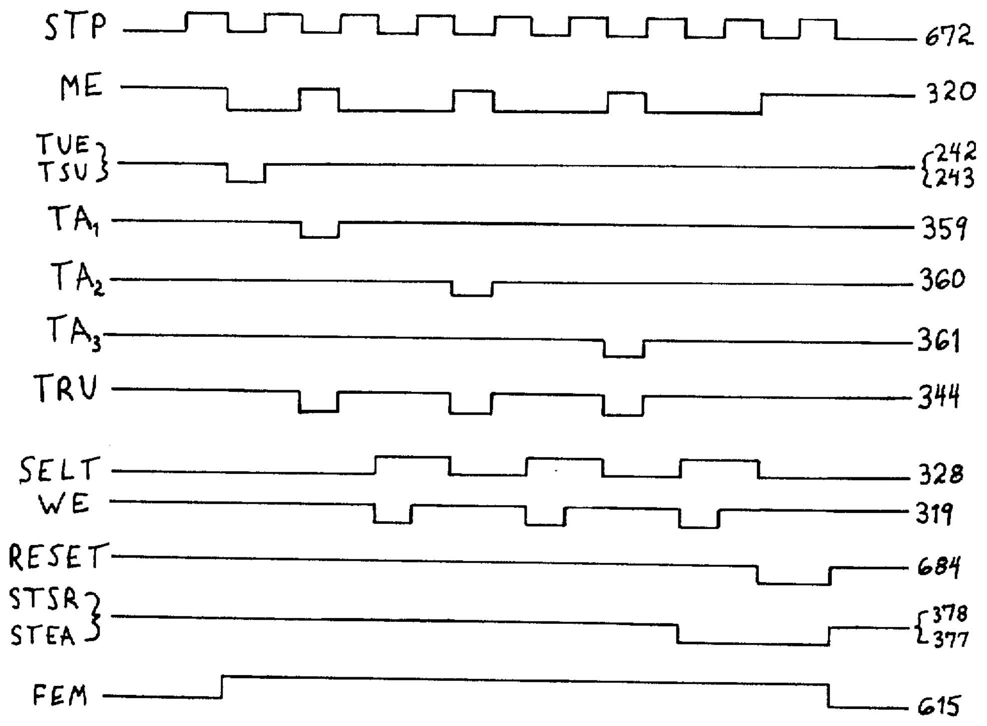
FIG. 6B is a set of graphs relating to the operation of the assembly of FIG. 5C.

As will be noted from FIG. 6B, where the pulses WE and ME have been illustrated in their respective time positions, writing lead 319 is energized almost continuously whereas reading lead 320 is without voltage during the greater part of an operating cycle. Upon the energization of that reading lead, the contents of store 301 or 302 at the location specified by the incoming address code are discharged via multiple 205 to a multiple 212' forming part of bus bar 212; another multiple 212'' of the same bus bar is connected to ancillary outputs of stores 301 and 302 to receive therefrom the binary complement of the bit group read out via multiple 205.

Multiple 214, leading to the field-address register 215 associated with storage unit 236, is shown split into three 4-lead submultiples 345, 346, 347 terminating at respective 4-bit subregisters 348, 349, 350 which form part of register 215. Similar submultiples 351, 352, 353 extend from these subregisters to respective groups of AND gates 354, 355, 356, one such group 365 being also inserted in the output multiple 226 of address register 209 having the same 4-bit capacity as each subregister 245–247. The AND gates of groups 354–356 have other inputs connected to a signal line 358 energizable by a pulse LSR from decoder 274 toward the end of an operating cycle in which a routing instruction intended for storage unit 236 is received; similarly, a pulse LEA on a signal line 366 unblocks the gate group 365 toward the end of a cycle in which the I/O unit 310 is to be addressed. Subregisters 348, 349, 350 are further provided with enabling inputs connected to respective leads 359, 360, 361 carrying staggered timing pulses $TA_1$, $TA_2$, $TA_3$ (cf. FIG. 6B) which makes these subregisters receptive to a field-address code read out from interim register 201.

Figure 4A:
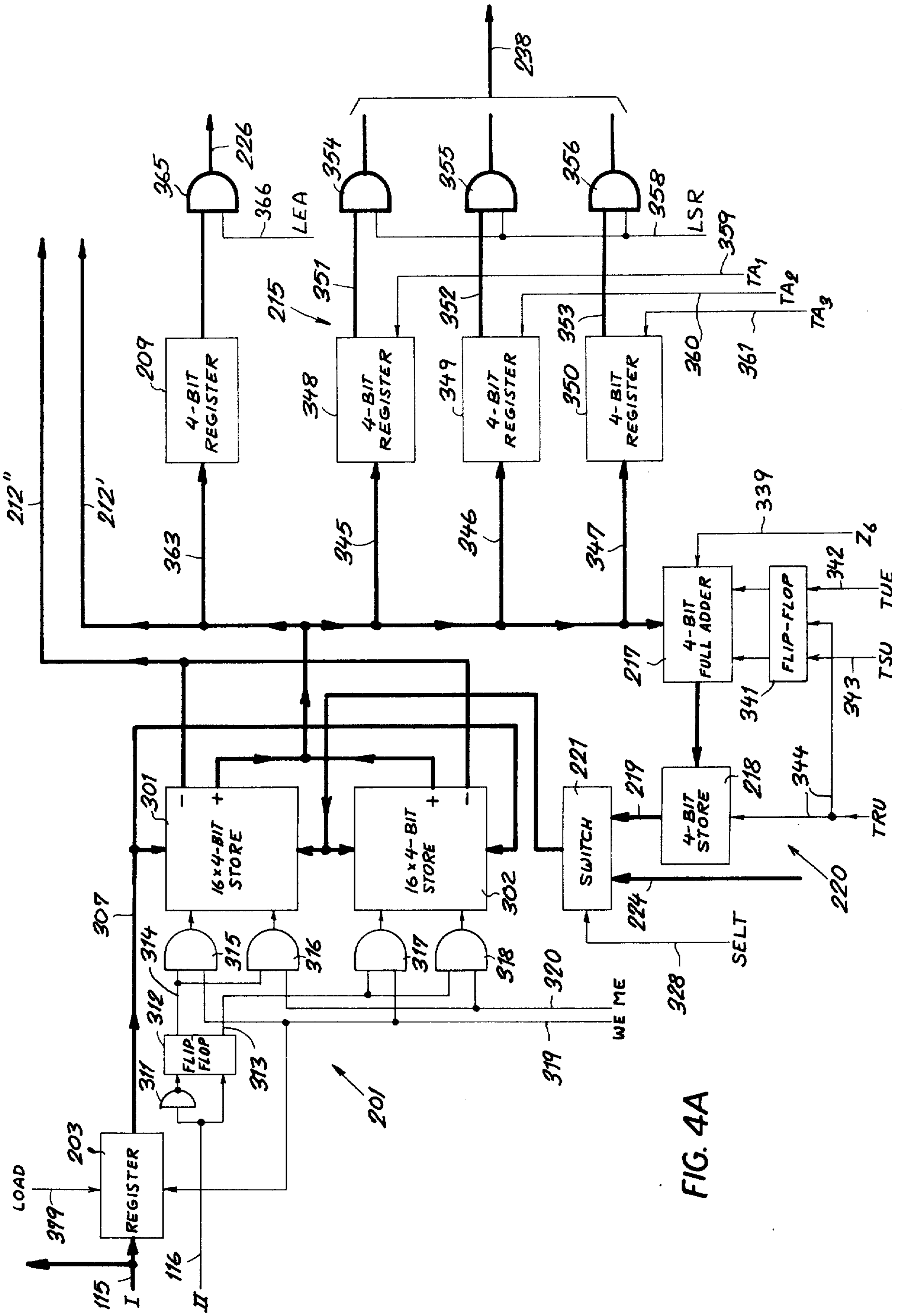
FIG. 4A is a more detailed circuit diagram of certain registers and associated circuitry included in the processor of FIG. 3.

The address modifier 220 of FIG. 3 has been shown in FIG. 4A as comprising a 4-bit full adder 217 working into a 4-bit store 218, such as a bank of flip-flops, in series with multiple 219. A flip-flop 341 is triggerable, jointly with store 218, by a pulse TRU from decorder 274 on a lead 344 to energize either of two control inputs of adder 217, depending on the energization of either of two input leads 342, 343 of flip-flop 314 with a signal TUE or TSU. In the first instance, i.e. in the presence of signal TUE, the contents of adder 217 are augmented by a unit value +1 if lead 339, terminating at that adder, is simultaneously energized by a bit $Z_6$ or like value. In the second instance, i.e. in the presence of signal TSU (and again with simultaneous energization of lead 339), an increment −1 is introduced into the adder, as by increasing its contents by the complement 1111 (i.e. adding a carry to each of its four stages). If $Z_6 = 0$, the 4 -bit field address readout from register 201 passes through adder 217, store 218 and switch 221 unchanged. The choice between signals TUE and TSU is determined by the value of bit $Z_5$ as will be described below with reference to FIG. 5C.

Switch 221 is triggerable by a signal SELT on a lead 328 so as to complete the feedback loop through adder 217 and store 218 when that lead is energized. As will be noted from FIG. 6B, such energization occurs three times per cycle and is accompanied each time by an interruption of the writing signal WE. Furthermore, each pulse of signal SELT is preceded by a timing and distributing pulse $TA_1$, $TA_2$ or $TA_3$ on lead 359, 360 or 361 coinciding with respective reading pulses ME on lead 320; in the presence of these timing pulses, enabling pulse TRU on lead 344 is interrupted. Thus, a recirculated field address is read out three times into the multiple 328 leading to storage unit 236, each time through a different subregister 348, 349 or 350. If the recirculated address is unmodified, all three subregister outputs energize the same output lead of an address decoder 443 (FIG. 4B) of memory 236 so that only one stored item will be selected; in the presence of increment +1 or −1, three adjoining locations in that memory are addressed to deliver a 12-bit message.

Figure 4B:
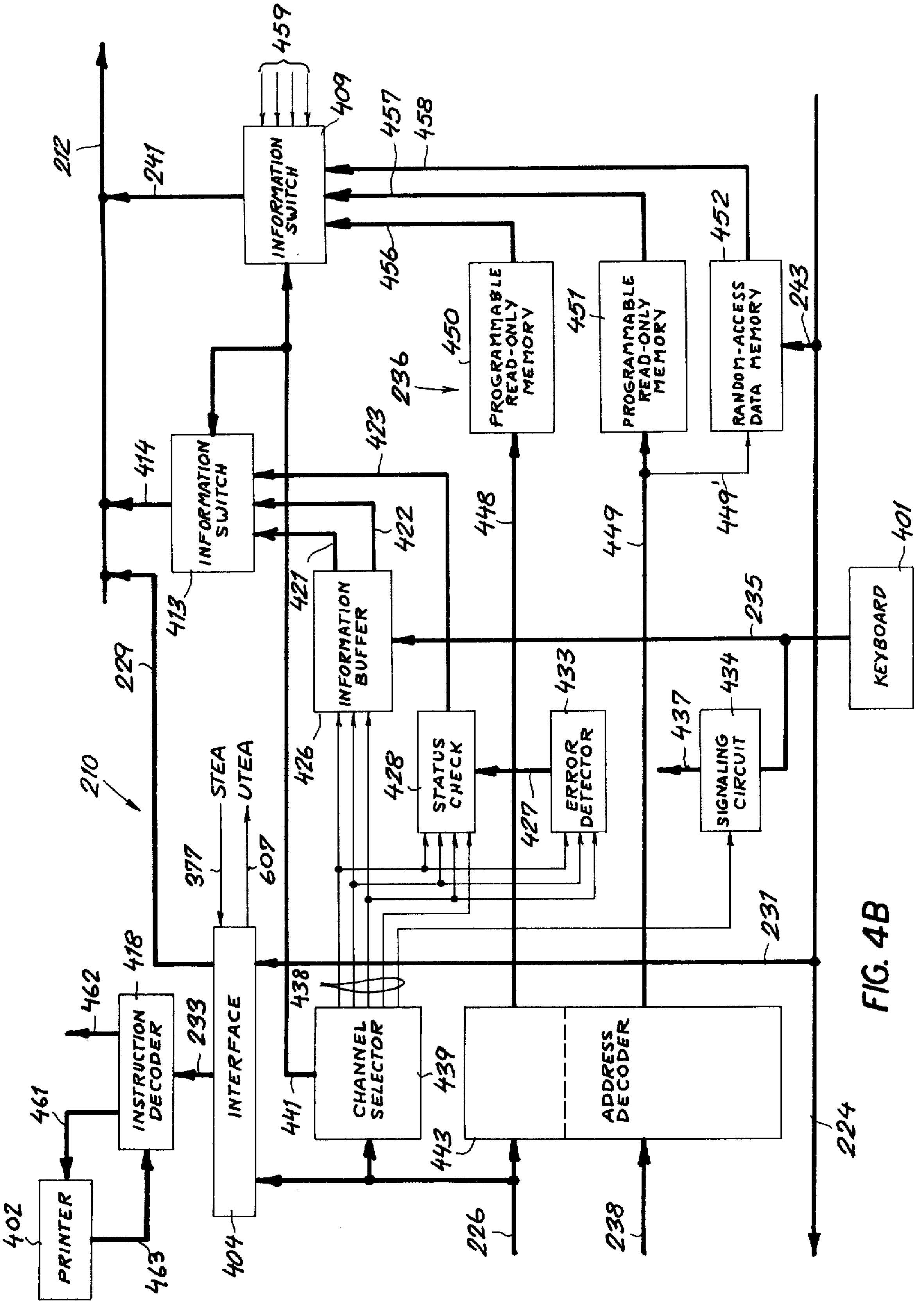
FIG. 4B shows details of a storage unit and an I/O unit located in the processor.

FIG. 4B shows, besides the aforementioned entrance or address decoder 443 of storage unit 236, a similar decoder 439 associated with I/O unit 210, this latter decoder operating as a channel selector giving access to a particular input or output device as specified by the address read out of register 201 over multiple 226. Since such an address may also require intervention of the storage unit 236, certain leads of multiple 226 terminate at the decoder 443. Furthermore, unit 210 consists essentially of an interface network 404 connected through a multiple 233 to an instruction decoder 418 which feeds the printer 402 and additional loads served by a multiple 462. Printer 402 receives from decoder 418, by way of a multiple 461, control signals for its various functions such as the typing of alphanumerical characters, line feed, spacing and carriage return. A further multiple 463, leading from the printer 402 back to the decoder 418, facilitates direct manual printing. Interface network 404 can also receive information from accumulator 258 by way of bus bar 224 through multiple 231.

Keyboard 401 works through its outgoing conductors 235 into a buffer register 426 from which the information stored therein can be transmitted, under the control of output leads 438 of channel selector 439, via several multiples 421, 422 and an associated multistage switch 413 to bus bar 212 for delivery to accumulator 258. A signaling circuit 434, also controlled by one of the output leads 438 of selector 439, generates on a set of leads 437 the command pulses necessary to carry out the functional instructions fed in via keyboard 401. Other conventional circuits associated with I/O unit 210 include a status-checking network 428, provided with an output multiple 423 terminating at switch 413, for ascertaining from time to time the condition of keyboard 401 and other, nonillustrated devices working into that switch; an error detector 433 is tied to checking circuit 428 via multiple 427.

Storage unit 236 is shown to comprise three memory sections 450, 451 and 452. Sections 450 and 451 may be of the programmable read-only type ("PROM") whereas section 452 may be a random-access memory ("RAM"). Memory section 452 has loading inputs connected to multiple 243 for receiving data from accumulator 258 via bus bar 224; all three sections can be read out into bus bar 212 via respective multiples 456, 457, 458 terminating at a multistage switch 409 which gives them slective access to a connecting multiple 414. Switches 409 and 413 are controlled from channel selector 439 via a set of leads 441; switch 409 can also be manually adjusted by way of leads 459. Both switches, advantageously, produce mutually complementary output signals to be transmitted to accumulator 258 over the two conjugate multiples 212', 212'' illustrated in FIGS. 4A and 4C.

Interface network 404, connected between bus bars 224 and 212 by the two multiples 231 and 229 also shown in FIG. 3, contains the timer 604 (not illustrated in FIG. 4B) which receives the start signal STEA from decoder 274 over lead 377 and emits a correlation signal UTEA over lead 607.

Like the subprogram memory 101 of FIG. 2, the various memory sections of storage unit 236 may also be composed of semiconductive elements or of ferrite cores.

Figure 4C:
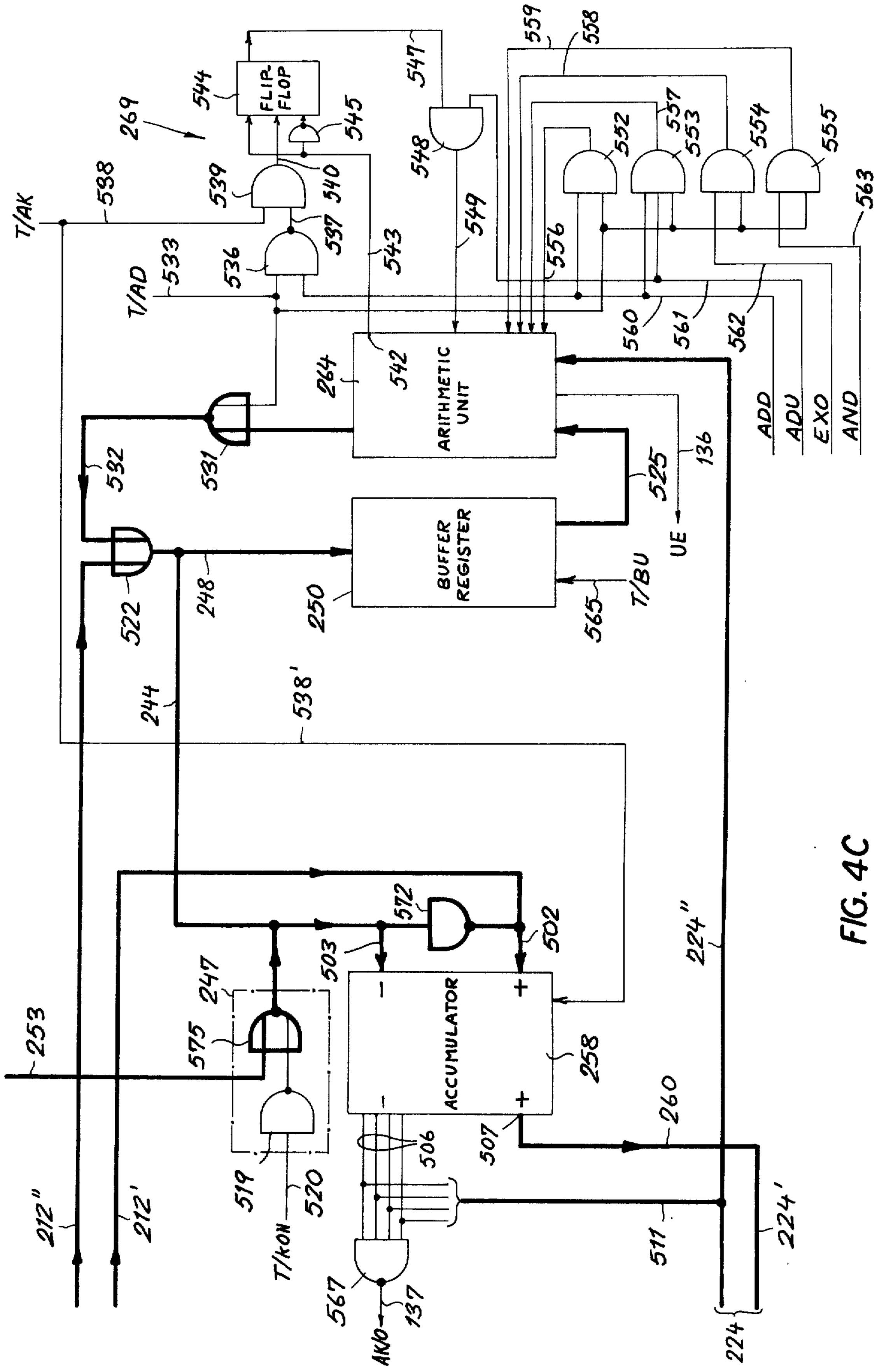
FIG. 4C shows details of an accumulator and an arithmetic unit, together with associated circuitry, also forming part of the processor.

In FIG. 4C the accumulator 258 has been more fully illustrated along with arithmetic unit 264 an buffer register 250 as well as associated circuitry. Accumulator 258 has an additive (noninverting) input 502 and a subtractive (inverting) input 503 as well as two outputs 506 (inverting) and 507 (noninverting). Multiple 212'' is connected by way of a bank of OR gates 522 and leads 244 to the inverting input 503, with extensions leading through a group of inverters 572 to the other input 502 which is directly connected to multiple 212'. Gate 247 comprises a bank of NOR gates 575 with first inputs connected to respective leads of multiple 253 and with second inputs energizable in parallel, via an inverter 519, from a lead 520 carrying an enabling pulse T/KON from decoder 274 in the presence of a numerical instruction. NOR gates 575, on being unblocked by the pulse T/KON, act as inverters for the bits arriving over multiple 253 whose negations are then fed directly to inverting input 503 and through inverters 572 to noninverting input 502 of accumulator 258. Outputs 506 and 507 work through leads 511, 260 into multiples 224' and 224'' of bus bar 224. Leads 511 also extend to an NAND gate 567 giving the "accumulaator empty" signal AK/O on lead 137. OR gates 522 also serve to channel the output signals of arithmetic unit 264, by way of respective NOR gates 531, to the accumulator inputs and in parallel therewith over leads 248 to buffer register 250. NOR gates 531 are unblocked by a timing signal T/AD applied via a lead 533 to their second inputs, the same lead extending to an input of a NAND gate 536 whose output lead 537 feeds an AND gate 539 also receiving a timing pulse T/AK via a lead 538 from which a branch 538' extends to an enabling input of accumulator 258. AND gate 539 works into a trigger input of a flip-flop 544 of the J/K type whose lateral date inputs are energizable by a carry lead 543 extending from a terminal 542 of unit 264; one of these data inputs is connected to lead 543 through an inverter 545. Flip-flop 544, when set in the presence of a carry on terminal 542, energizes over a lead 547 one input of an AND gate 548 whose other input is tied to a lead 561 coming from decoder 274. A command "add with carry" energizes the lead 561 with a pulse ADU to open the AND gate 548 which, via a conductor 549, energizes a carry input 542 of unit 264. Flip-flop 544 and its associated coincidence gates form part of the overflow register 269 also shown in FIG. 3.

Lead 561 is one of four such conductors 560–563 carrying logical commands ADD, ADU, EXO and AND. These conductors feed respective AND gates 552, 553, 554 and 555 whose other inputs are connected in parallel to lead 533 carrying the generic timing pulse T/AD; conductor 561 also extends to a further input of AND gate 553. In the presence of pulse T/AD, signal ADD — if unaccompanied by signal ADU — causes the performance of a bit-by-bit addition, without carry, in unit 264. If signals ADD and ADU are simultaneously present, AND gate 553 conducts to bring about a full addition with carry as discussed above. Signal EXO results in an Exclusive-OR operation, whereas signal AND produces the logical function corresponding to this designation.

Also shown in FIG. 4C is the lead 136, originating at arithmetic unit 136, which carries the signal UE informing the controller 133 (FIG. 2) that unit 264 has performed its calculations and has discharged its contents via gates 531 and 522 into accumulator 258 in parallel with buffer register 250.

Figure 5A:
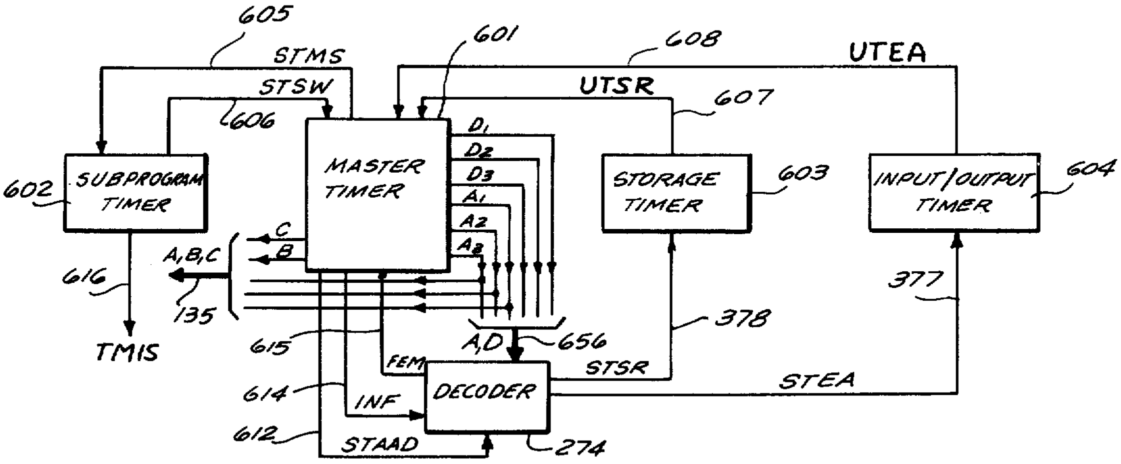
FIG. 5A is a block diagram of a timing circuit serving the system of FIG. 2.

FIG. 5A illustrates the interplay of the several timers 601–604 and of decoder 274 which has its own timing circuit as described below with reference to FIG. 5C. Master timer 602 emits pulses $A_1$, $A_2$, $A_3$, $D_1$, $D_2$, $D_3$ (collectively designated A, D on a multiple 656) as well as B and C, thus generating the pulse combination A, B, C on the lead 135 terminating at controller 133 (cf. FIG. 2). The relative time positions of all these pulses can be seen in FIG. 6A. Timer 602, in subprogram memory 101, exchanges with timer 601 the pulses STMS and STSW on leads 605, 606 and also generates control pulses TMIS for the discharge of buffer register 602 on a lead 616. Timer 603 in storage unit 236 (FIG. 3) receives its start signal STSR from decoder 274 and transmits the correlation signal UTSR to timer 601 on leads 378 and 607, respectively. Timer 604 of I/O unit 210 similarly receives and transmits, on leads 377 and 608, the start signal STEA from decoder 274 and the correlation signal UTEA destined for timer 601.

Timer 601 further delivers to decoder 274, over a pair of leads 612 and 614, the "start address readout" signal STAAD and an enabling pulse INF activating the storage and I/O units. Decoder 274, in turn, sends to timer 601 over a lead 615 a correlation signal FEM indicating the progress of its cycle.

Figure 5B:
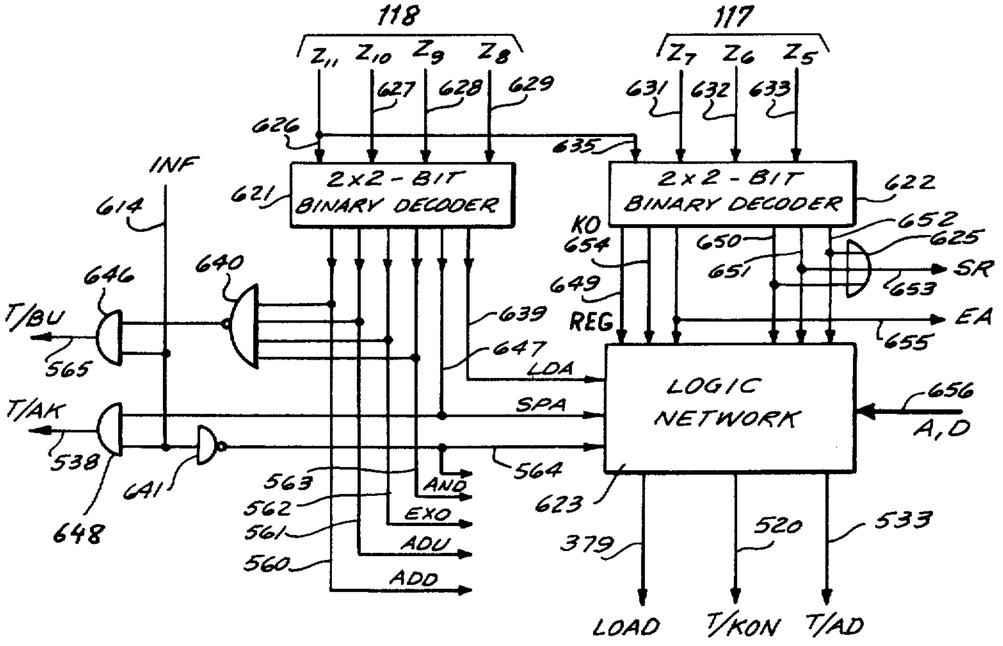
FIG. 5B is a circuit diagram of one part of a functional decoder included in the system.

FIG. 5B shows that part of decoder 274 which generates the logical instructions ADD, ADU, EXO and AND on leads 560–563, the enabling signals T/AK and T/BU for accumulator 258 and buffer register 250 on leads 538 and 565, the corresponding signals T/KON (indicating operation on a constant) for gate 247 and T/AD for arithmetic unit 264 on leads 520 and 533, the register-loading command LOAD on lead 379, and two alternative signals SR (activation of storage unit 236), EA (activation of I/O unit 210) on a pair of leads 653, 655. Tow 2×2-bit binary decoders 621, 622 receive the bits $Z_{11}$, $Z_{10}$, $Z_9$, $Z_8$ on leads 626–629, forming part of channel 118, and $Z_7$, $Z_6$, $Z_5$ on leads 631–633, forming part of channel 117; discriminating bit $Z_{11}$ is also received by decoder 622 over a branch lead 635. Conductors 560–563, carrying the aforementioned logical instructions, emanate from decoder 621 and have branches merged in a NAND gate 640 which works into one input of an AND gate 646 also receiving the enabling pulse INF on lead 614 at its other input; when thus enabled, and in the absence of any logical instruction, it energizes the lead 565 to discharge the contents of register 520 (FIG. 4C) into unit 264. Another output lead 639 of decoder 621 carries a "load accumulator" signal LDA into a logic network 623; the unloading of accumulator 258 is initiated by a signal SPA on a further output lead 647 of that decoder which also extends to an input of an AND gate 648, having a second input tied to lead 614, whose output lead 538 is energized to discharge the contents of the accumulator upon coincidence of signals INF and SPA. Through an inverter 641 the negation of signal INF is applied to network 623 via a lead 564. Network 623 receives the timing pulses A, D (cf. FIG. 5A) over multiple 656.

The lead 655, carrying the signal EA, originates at decoder 622 and also extends to network 623. Three other output leads 650, 651, 652 of decoder 622, also terminating at network 623, carry the information (as determined by bits $Z_5$ and $Z_6$) whether a field address is to read out from register 201 into decoder 443 and, if so, whether it is to be recirculated through address modifier 220 with positive or negative incrementation, or unchanged, as described above with reference to FIG. 4A; these three leads are connected through an OR gate 625 to the conductor 653 carrying the signal SR. A signal REG on a lead 649 or a signal KO on a lead 654, both extending from decoder 622 to network 623, indicates that interim register 201 must be activated (in the case of a routing instruction) or that the processing of a constant is involved (in the case of numerical instruction).

Figure 5C:
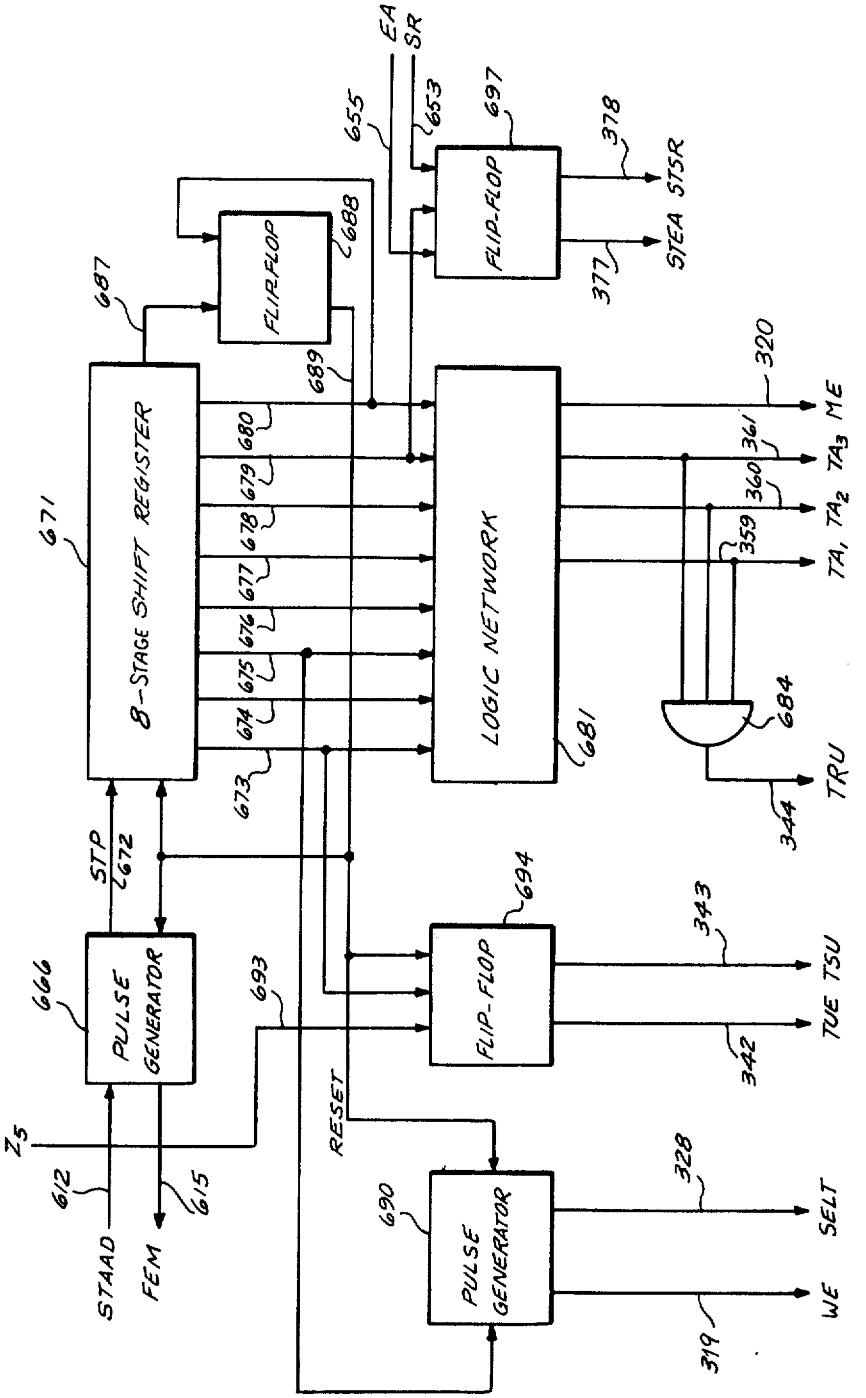
FIG. 5C is a circuit diagram of another part of the decoder.

In FIG. 5C there is shown that part of the decoder which controls the operation of the address-extracting circuit particularly described with reference to FIG. 4A. A pulse generator 666, started by the signal STAAD on lead 612, produces a train of eight stepping pulses STP on a lead 672 as depicted in FIG. 6B. These pulses are successively distributed by an 8-stage shift register 671 to a set of leads 673–680 extending to a logic network 681. Pulse generator 666 and shift register 671 together constitute a timing circuit which is also representative of the timers 601–604 shown in FIG. 5A.

Lead 673, energized on the trailing edge of the first pulse, triggers a flip-flop 694 to set it if a lead 693, terminating at its data input and branching off the lead 633 seen in FIG. 5B, is energized by a true bit $Z_5$. When thus set, flip-flop 694 emits the "add 1" signal TUE on its output lead 342; otherwise, the second output lead 343 delivers the "subtract 1" signal TSU. Network 681 gives rise to the distributing pulses $TA_1$, $TA_2$, $TA_3$ on leads 359–361 and to the reading pulse ME on lead 320. Pulses $TA_1$–$TA_3$, which appear in negated form, interrupt the recurrent enabling pulse TRU in the output of an AND gate 684 to whose inputs the normally energized leads 359–361 are connected.

The trailing edge of the third pulse, by energizing the lead 673, actuates a pulse generator 690 which produces the writing signal WE and the switching signal SELT on leads 319 and 328, respectively.

A flip-flop 697 is either set or reset by the energization of lead 379, on the trailing edge of the seventh pulse, to emit either of the two start signals STEA, STSR on leads 377, 378 in dependence upon the presence of signal EA or SR on lead 655 or 653. The eighth pulse, whose trailing edge energizes the lead 680, sets a flip-flop 688 which is reset shortly thereafter by the energization of a lead 687 as the pulse generator 666 is arrested by the trailing edge of a pulse RESET appearing on an output lead 689 of theat flip-flop. This latter pulse also clears the register 671, stops the generator 690 and resets the flip-flop 694. The correlation signal FEM on lead 615, which emanates from generator 666, terminates with the last (ninth) pulse thereof and thus indicates by its trailing edge the completion of the cycle.

The various pulses referred to above, most of which have been represented by the graphs of FIGS. 6A and 6B together with the designations of the conductors on which they appear, can be conventionally generated in a number of ways designed to maintain their relative time positions. By way of example, however, we have indicated in FIG. 6A an advantageous manner in which such signals can be derived from a pair of square waves *a, b* in quadrature with each other. Thus, a signal A is produced by passing the two square waves through an OR gate; if this signal is fed in parallel to three AND gates successively enabled by a pulse counter, it can be split into its three components $A_1$, $A_2$, $A_3$. In an analogous manner, wave *a* can be divided to yield pulses $D_1$, $D_2$, $D_3$. Signal B is obtained by passing the waves *a* and *b* through an AND gate; signal C is similarly generated with the aid of a NAND gate. These and other logical expedients well known per se can also be utilized to produce the several signals of FIG. 6B.

Figure 7B:
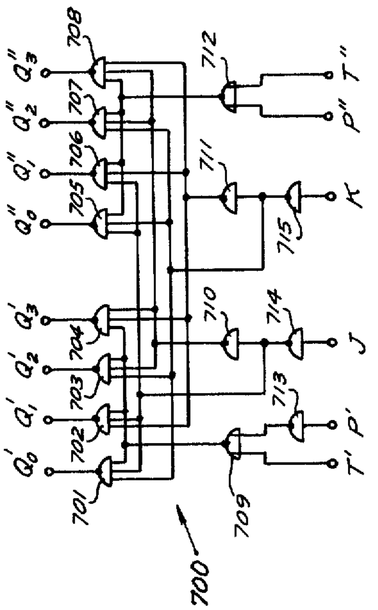
FIG. 7B is a more detailed circuit diagram of the decoder shown in FIG. 7A.
Figure 7A:
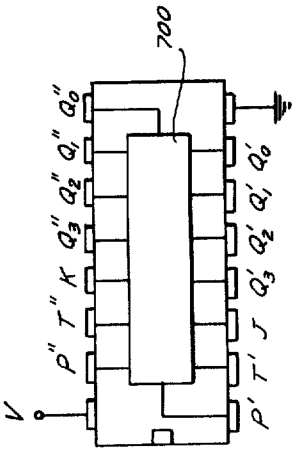
FIG. 7A is a block diagram of a dual 2-bit binary decoder adapted to be used in the system of FIG. 2.
Figure 7C:
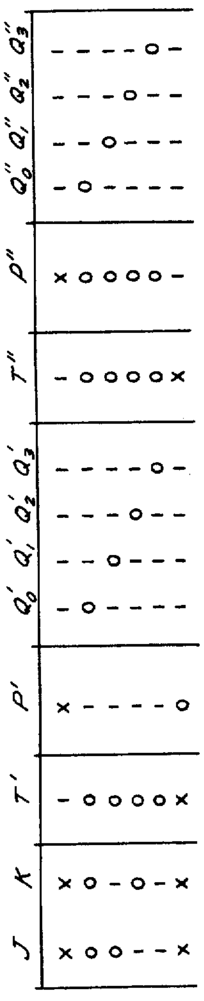
FIG. 7C is an associated truth table.

The diverse circuit components shown in block form in the preceding FIGURES are conventional and thus do not require a more detailed description. For the sake of completeness, however, we have shown typical realizations of some of these components — in modular form — in subsequent FIGURES. Thus, FIG. 7A represents the physical layout and FIG. 7B gives the circuitry of a 2×2-bit binary decoder 700 for use in the circuit of FIG. 5B (components 621 and 622), this module having data inputs J, K, biasing inputs P', P'', timing inputs T', T'', and two sets of outputs $Q_0'$–$Q_3'$, $Q_0''$–$Q_3''$. A further terminal is connected to a source of d-c voltage V while another one is grounded. The output terminals are energizable through respective NAND gates 701–708 with input connections including two NOR gates 709, 712 and five inverters 710, 711, 713, 714, 715. The corresponding truth table, FIG. 7C, shows the selective marking, by a "low" signal (0), of individual output terminals with eight different combinations of biasing and input voltages in the presence of (negated) timing pulses. The symbol X indicates that the potential of a particular terminal, either "low" (O) or "high" (1), is immaterial.

Figure 8B:
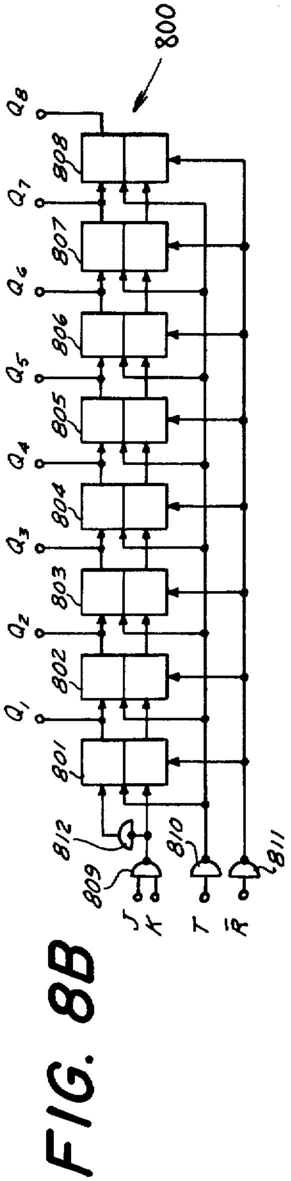
FIG. 8B is a corresponding circuit diagram.
Figure 8D:
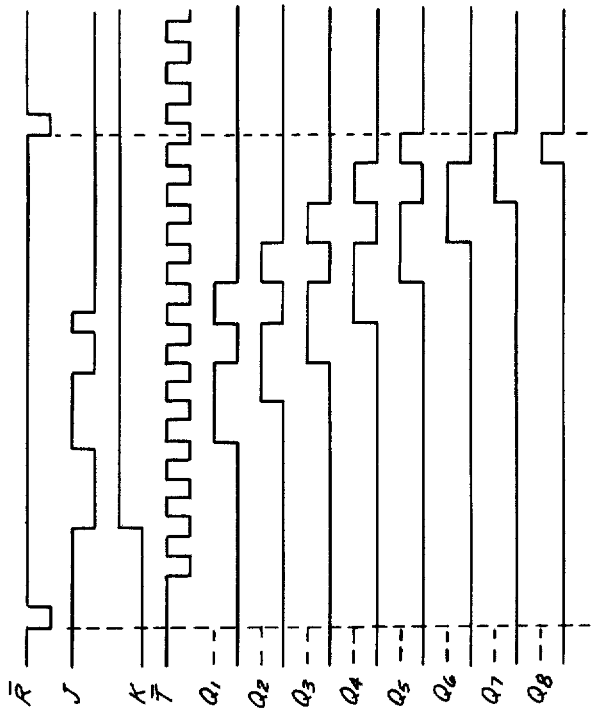
FIG. 8D is a set of graphs illustrating the operation of the shift register.
Figure 8A:
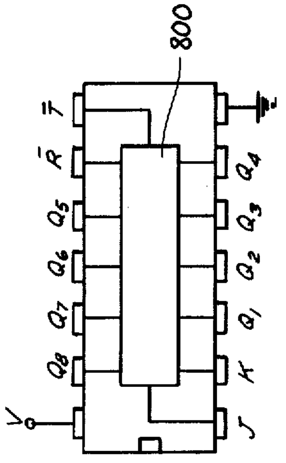
FIG. 8A is a block diagram of an 8-stage shift register adapted to be used in our system.
Figure 8C:
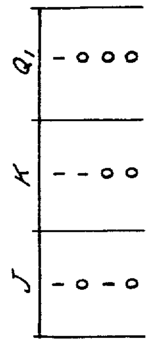
FIG. 8C is an associated truth table.

In a similar manner, FIG. 8A shows the physical layout and FIG. 8B gives the circuitry of an eight-stage shift register 800 adapted to be used as the component 671 (FIG. 5C). This register consists of eight flip-flops 801 1 808 with set outputs $Q_1$–$Q_8$; trigger inputs energizable by a train of timing pulses $\overline{T}$ through an inverter 810; data inputs which in the case of the first stage 801 are connected directly and through an inverter 812, respectively, to the output of an AND gate 809 receiving the signals J and K; and resetting inputs energizable by a pulse $\overline{R}$ through an inverter 811. FIG. 8C is the corresponding truth table while FIG. 8D graphically represents the relative time positions of the various input and output signals.

Figure 9C:
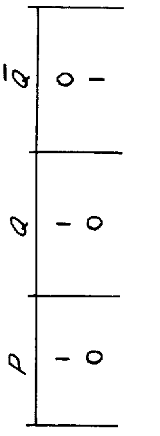
FIG. 9C is an associated truth table.
Figure 9B:
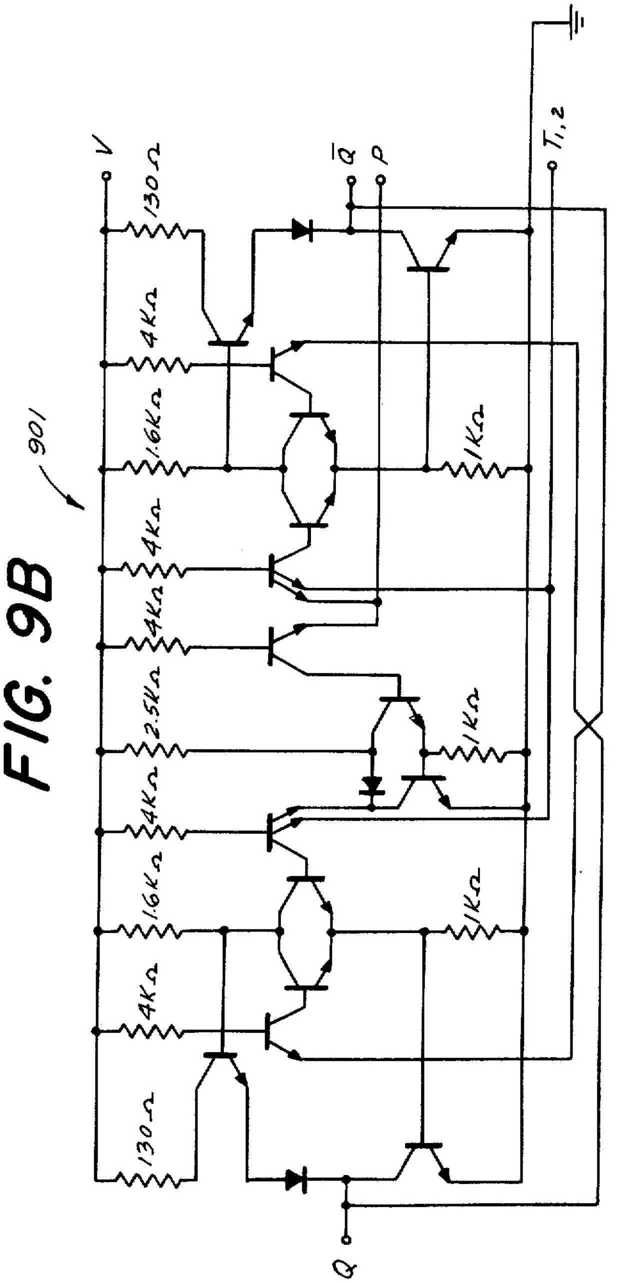
FIG. 9B is a corresponding circuit diagram.
Figure 9A:
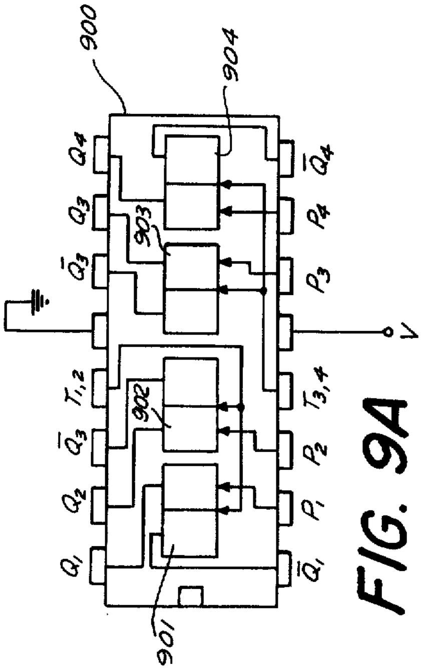
FIG. 9A is a block diagram of a quadruple flip-flop adapted to be used in the system.

A quadruple flip-flop 900, shown in FIG. 9A, can be used as the 4-bit store 218 of FIG. 4A. Its four stages 904–904 can be triggered, in pairs, by timing pulses $T_{1,2}$ and $T_{3,4}$ to produce set and reset outputs $Q_1$–$Q_4$ and $\overline{Q}_1$–$\overline{Q}_4$ in response to input signals $P_1$–$P_4$. FIG. 9B shows the circuitry of a single stage, 901, whose truth table is represented by FIG. 9C.

Figures 10A, 10B:
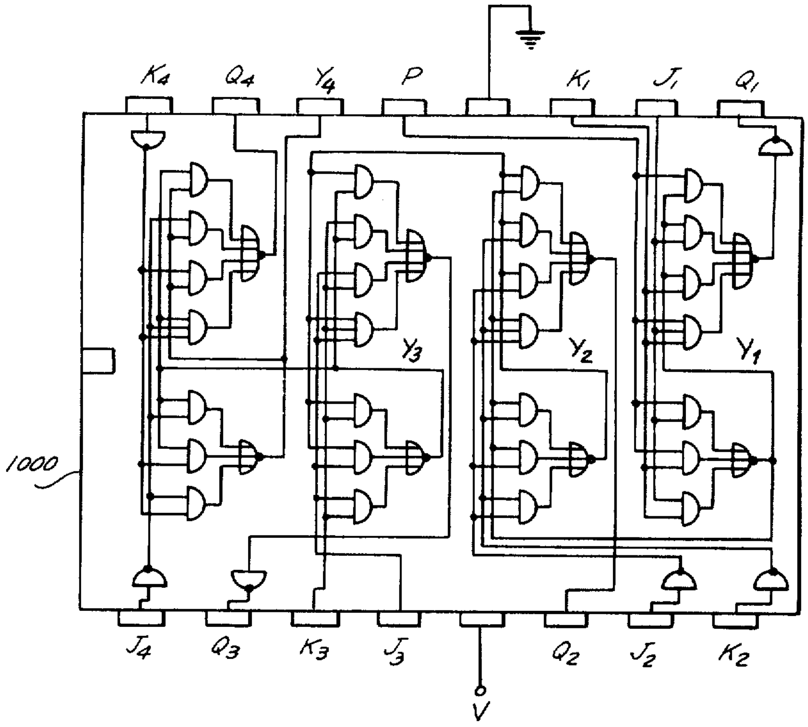
FIG. 10A is a circuit diagram of a 4-bit full adder adapted to be used in the system.
FIG. 10B is a corresponding truth table.

In FIG. 10A we have shown a four-stage full adder 1000 which can be used for component 217 of FIG. 4A. Its eight input terminals $J_1$–$J_4$ and $K_1$–$K_4$ are paired, as indicated in the truth table of FIG. 10B, so as to accept four digits giving rise to output signals $Q_1$–$Q_4$ as well as internal carries $Y_1$, $Y_2$, $Y_3$ and a final carry $Y_4$. A biasing terminal P, when energized, increases the value of the 4-bit output signal by 1, as will be apparent from a comparison of the two pairs of columns for outputs $Q_1= Q_3$ and $Q_2= Q_4$ of the simplified truth table in the cases of P=0 and P=1. The internal carry $Y_2$ has the same value as the biasing signal P.

We claim:

1. A method of data processing in a computer provided with storage means for retaining digital information, an accumulator input/output means for modifying said digital information, and a subprogram memory for the storage and sequential readout of a multiplicity of binary instruction words of invariable length classified in a plurality of categories including numerical instructions, routing instructions and jump instructions, comprising the steps of:

dividing each stored instruction work into a plurality of sections including a classification section, an operation/address section and a data/address section;

identifying said jump instructions by a characteristic binary value of a discriminating bit in said classification section;

determining the category of each instruction word read out from said memory by decoding the classification section thereof;

simultaneously decoding the operation/address section of said word;

transmitting the contents of the data/address section of a word identified as a numerical instruction to said accumulator for arithmetic processing in response to operational commands derived from the decoded classification and operation/address sections thereof;

selecting digital information for exchange between said accumulator, said storage means and said input/output means and treating the selected information in conformity with operational commands derived from the decoded classification and operation/address sections thereof; and altering the readout sequence of said subprogram memory in response to the contents of at least part of a word identified as a jump instruction.

2. A method as defined in claim 1, comprising the step of including in each instruction word an additional section evaluated jointly with the data/address section of a routing instruction in controlling said exchange of information.

3. A method as defined in claim 2, comprising the step of limiting said additional section to a single bit.

4. A method as defined in claim 3, further comprising the step of defining each instruction word by $n$ bits, said discriminating bit being the $n^{th}$ bit, said classification section encompassing a group of highest-ranking bits including said discriminating bit, said data/address section encompassing a group of lowest-ranking bits, said operation/address section encompassing a group of intermediate bits, the single bit of said additional section being inserted between said data/address and operation/address sections.

5. A method as defined in claim 4 wherein $n = 12$, comprising the step of including in said classification section the four highest-ranking bits, said operation/address section encompassing three intermediate bits, said data/address section encompassing the four lowest-ranking bits.

6. A method as defined in claim 1, comprising the step of including in said jump instructions a plurality of jump-forward instructions and a jump-back instruction, the latter being distinguished from said jump-forward instructions by the presence of a special code in said classification section.

7. A method as defined in claim 6, comprising the step of using the entire instruction word to locate a new word to be read out from said subprogram memory in the case of a jump-forward instruction.

8. A method as defined in claim 6, comprising the step of distinguishing numerical instructions from routing instructions by the presence of said special code in the classification section thereof.

9. A method as defined in claim 1, comprising the step of identifying in the data/address section of a routing instruction an item of information entered in said storage means at an original address, part of the operation/address section of said routing instruction being used to identify another item of information entered in said storage means at an address adjoining said original address.

10. A method as defined in claim 9, comprising the step of defining said part of the operation/address section by a pair of bits enabling selective identification of a second address immediately preceding and a third address immediately following said original address.

11. In an electronic data-processing system, in combination:

a subprogram memory for the storage of a multiplicity of binary instruction words of predetermined length to be read out in succession;

extraction means for the parallel readout of the bits of each instruction word from said subprogram memory, said extraction means including a data/address section, an operation/address section and a classification section;

decoding means for an operation code forming part of each instruction word read out by said extraction means;

selection means for addressing said subprogram memory to alter the readout sequence thereof;

control means for said selection means;

processing means including an accumulator for digital information, storage means connected across said accumulator in a first loop, input/output means connected across said accumulator in a second loop, and interim register means connected across said accumulator in a third loop said third loop having branches leading to said storage means and to said input/output means for enabling selective exchange of information between said accumulator, said storage means and said input/output means under the control of said decoding means;

circuitry for the selective transmission of bits from any read-out instruction word to said decoding means, selection means and processing means, said circuitry comprising one channel extending from the data/address section of said extraction means to said accumulator and in parallel therewith to said interim register means and to said selection means, another channel extending from the operation/address section of said extraction means to said selection means and in parallel therewith to said decoding means, and a further channel extending from the classification section of said extraction means to said control means and in parallel therewith to said decoding means;

signal paths leading from said decoding means to said processing means and to said subprogram memory for (a) enabling said accumulator to receive data via said one channel in the presence of an operation code in said further channel identifying a numerical instruction, (b) enabling said interim register means to receive a first address code via said one channel in the presence of an operation code in said further channel identifying a routing instruction, and (c) supplementing said first address code with a second address code transmitted to said selection means via said other channel in the presence of a discriminating bit of predetermined binary value appearing in said further channel to identify a jump instruction, said control means enabling said selection means to decode said second address code for addressing said subprogram memory in response to said discriminating bit; and timing means for establishing a recurrent readout cycle for said subprogram memory.

12. The combination defined in claim 11 wherein said interim register means comprises a pair of register halves with respective control inputs for writing and reading, said circuitry further comprising a lead extending from said extraction means to said interim register means for alternately energizing said control inputs in response to respective values of an additional bit of a routing instruction read out from said subprogram memory.

13. The combination defined in claim 12 wherein said lead has a branch extending to said selection means for delivering said additional bit thereto as part of said second address code in the case of a jump instruction.

14. The combination defined in claim 11 wherein said storage means and said input/output means are respectively provided with a first and a second address register connected to receive multibit items of digital information from said accumulator via said interim register means, at least one of said address registers having a storage capacity for a number of bits several times that of any of said multibit items, said interim register means being provided with address-modification means controlled by said decoding means and by said timing means for altering the numerical value of an item temporarily stored in said interim register means and for suequentially transmitting both the original and the altered numerical value of the stored item to said one of said address registers during one readout cycle in response to a predetermined bit value in a part of a routing instruction concurrently transmitted to said decoding means.

15. The combination defined in claim 14 wherein said address-modification means comprises a feedback loop extending from an output of said interim register means to an input thereof, a full adder in said feedback loop, and bistable means settable by said decoding means for introducing a predetermined supplemental numerical value into said full adder.

16. The combination defined in claim 14 wherein said timing means includes a shift register, pulse-generating means working into said shift register and circuit means connected to certain stages of said shift register for deriving therefrom a plurality of control signals for said address-modification means.

17. The combination defined in claim 11 wherein said processing means further includes an arithmetic unit connected across said accumulator in a fourth loop for logically combining the contents of said accumulator with selected items of information of said storage means under the control of said decoding means.

18. The combination defined in claim 17 wherein said processing means includes electronic gate means controlled by said decoding means for selectively connecting said fourth loop to said one channel in the presence of a numerical instruction.

19. The combination defined in claim 17 wherein said fourth loop has a feedback branch including a buffer register connected to receive digital information from said storage means, said input/output means, said interim register means and said arithmetic unit for recirculation to the latter.

20. The combination defined in claim 19 wherein said third loop includes a pair of conductor multiples for respectively delivering complementary information from said interim register means to an inverting and a noninverting input of said accumulator, one of said conductor multiples extending to said buffer register.

21. The combination defined in claim 17, further comprising signaling means extending from said arithmetic unit to said control means for informing same of the completion of a logical operation.

22. The combination defined in claim 11 wherein said selection means includes a first and a second multistage register having corresponding stages interconnected, an address decoder for said subprogram memory connected in parallel with said second multistage register to the stages of said first multistage register, and electronic switch means responsive to said control means; said one channel and said other channel together comprising a multiplicity of conductors normally connected through said electronic switch means to associated stage inputs of said first multistage register for delivering thereto respective bits of said second address code in the presence of said discriminating bit and of bit combinations in said further channel identifying a jump-forward instruction, said second multistage register having stage outputs connectable through said electronic switch means to respective stage inputs of said first multistage register, said control means being responsive to said discriminating bit to command the transfer of the contents of said first multistage register to said second multistage register and to said address decoder, said control means being further responsive to a special code in said further channel identifying a jump-back instruction to reverse said electronic switch means for retransferring a previously transferred address from said second to said first multistage register for another transmission to said address decoder.

23. The combination defined in claim 11 wherein said timing means comprises individual timers with mutually independent operating cycles for said subprogram memory, said decoding means, said storage means and said input/output means, said timers being provided with connections for correlating the starting points of their respective operating cycles.

* * * * *